J. MENNE.
TRACTION WHEEL.
APPLICATION FILED AUG. 5, 1914.

1,142,189.

Patented June 8, 1915.

Inventor
Joseph Menne.

Witnesses
Frederick W. Ely
R. M. Smith

By Victor J. Evans
Attorney

UNITED STATES PATENT OFFICE.

JOSEPH MENNE, OF GREEN BAY, WISCONSIN.

TRACTION-WHEEL.

1,142,189.  Specification of Letters Patent.  Patented June 8, 1915.

Application filed August 5, 1914. Serial No. 855,257.

*To all whom it may concern:*

Be it known that I, JOSEPH MENNE, a citizen of the United States, residing at Green Bay, in the county of Brown and State of Wisconsin, have invented new and useful Improvements in Traction-Wheels, of which the following is a specification.

This invention relates to traction wheels for motor vehicles, the object in view being to provide a vehicle wheel with a plurality of traction spikes so combined with the wheel that said spikes may be retracted from their working positions and locked in such retracted position by simple and novel means which will prevent the accidental movement of such traction spikes to their operative position thus avoiding any danger of the wheel injuring city streets and modern road beds. At the same time, when the spikes are needed for extracting the vehicle from soft and marshy spots, the traction spikes may be easily and conveniently released and allowed to move to their working positions.

With the above and other objects in view, the invention consists in the novel construction, combination and arrangement of parts, as herein described, illustrated and claimed.

Figure 1:
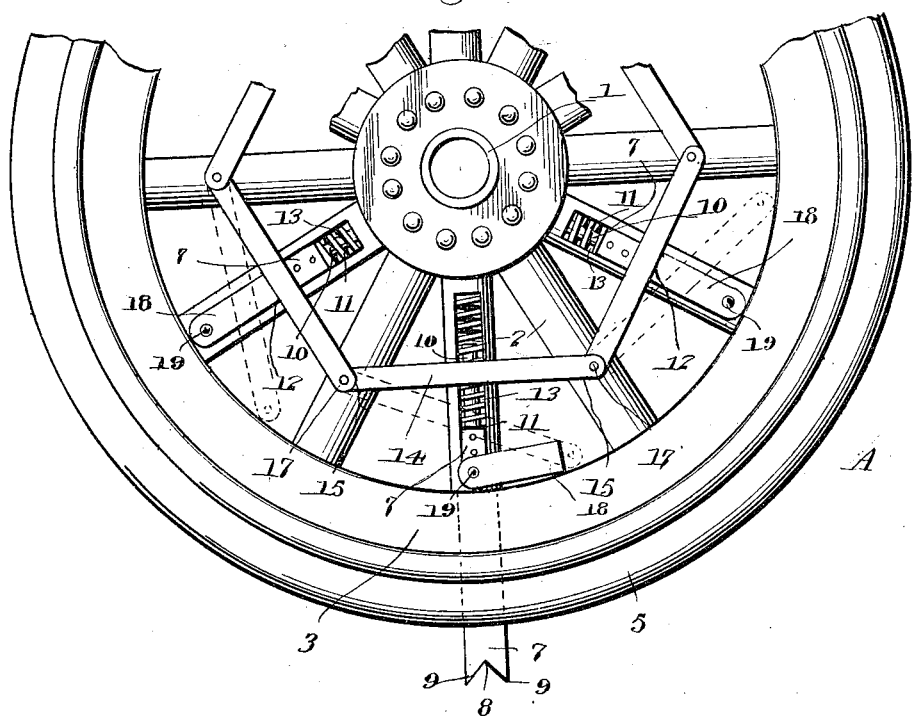
Figure 2:
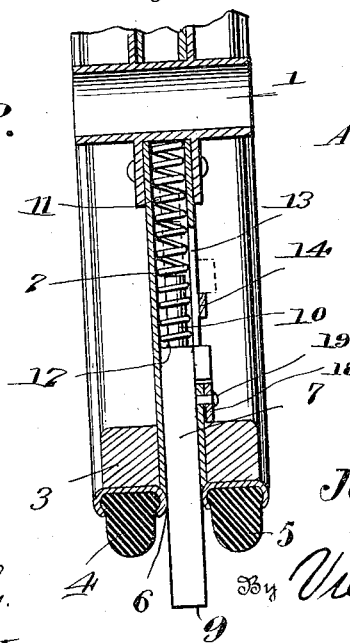

In the accompanying drawings:—Figure 1 is a side elevation of a sufficient portion of a vehicle wheel to illustrate the application of the present invention thereto. Fig. 2 is an enlarged radial section through the wheel showing the manner of mounting and actuating the traction spikes.

Referring to the drawings A generally designates a vehicle wheel which in the present instance is shown as of the heavy duty motor truck type, said wheel comprising a hub 1, spokes 2, and rim 3 to which the tire is applied, said tire, in the preferred embodiment of this invention, consisting of two annular sections 4 and 5 arranged in spaced relation to each other and leaving an intervening channel 6 in the plane of which the traction spikes of this invention are arranged.

In the preferred embodiment of this invention, every other spoke 2 is constructed as illustrated in the detail sectional view, Fig. 2. That is to say, every other spoke is of hollow or tubular construction so as to admit of the sliding therein of a traction spike 7. The main body of the traction spike is preferably square or poly-sided in cross section to prevent the same from turning on its longitudinal axis and it is provided in the outer end thereof with a V-shaped notch 8 thereby providing two chisel shaped gripping edges 9 which obtain a positive hold on the road surface in either direction of rotation of the wheel A.

Each traction spike 7 is also provided with an inwardly extending rounded shank or stem 10 and around this stem is disposed a coiled expansion spring 11 which lies within the tubular spoke 2 and serves to thrust the spike outwardly, the outward movement of the spike being limited by means of a lug or shoulder 12 projecting from one side of the main body of the spike and working in a longitudinal slot 13 in one side of the spoke. The lug or shoulder 12 also assists in locking the traction spike in its retracted position as indicated in Figs. 1 and 2.

In connection with each traction spike, I employ a latch bar 14 which is pivotally connected at the end 15 to one of the spokes and detachably connected at the end 16 to another spoke which is provided with a stud 17 behind which the adjacent extremity of the latch bar 14 may be held.

In connection with each of the slotted spokes, I prefer to employ a shutter 18 pivotally attached to the spoke at 19 and adapted to be swung through the arc of approximately 90°, as indicated in Fig. 1, the shutter 18 being adapted, when the mechanism is not in use to close in the outer end of the spring 11 and exclude foreign matter therefrom.

From the foregoing description taken in connection with the accompanying drawings it will now be seen that when the traction spikes are not needed, they may be drawn inwardly and locked by means of the bars 14 which engage the lugs or shoulders 12 on the spikes. When the spikes are thus retracted and locked, they will not engage and injure the road surface. When, however, the machine is traveling over soft ground or becomes mired in a soft place, the bars 14 may be disconnected from the studs 17 thus allowing the traction spikes to be thrust outwardly by means of the springs 11. The projecting ends of the spikes will thus obtain a firm hold on the ground and enable the machine to extricate itself from a soft place. Upon reaching hard ground, the spikes will automatically telescope into the tubular spokes 2 thus avoiding any jarring of the machine until the spokes are again fully retracted and locked by means of the bars 14.

What I claim is:—

1. A traction wheel for motor vehicles comprising a hub, rim and spokes, certain of said spokes being of tubular or hollow formation, spring-thrust traction spikes mounted to telescope into said tubular spokes and work through said rim, a lug on each spike projecting beyond the lateral plane of the respective spoke, and a locking bar for each spike, said bar being pivotally attached at one end to one of the spokes, detachably fastened at its opposite end to another spoke, and engaging said lug to hold the spike in a retracted position.

2. A traction wheel for motor vehicles comprising a hub, rim and spokes, certain of said spokes being of tubular or hollow formation, a tire consisting of two annular sections in spaced relation to each other leaving an intervening channel, spring-thrust traction spikes mounted to telescope into said tubular spokes and work through said rim and between said annular tire sections, a lug on each spike projecting beyond the lateral plane of the respective spoke, and a locking bar for each spike, said bar being pivotally attached at one end to one of the spokes, detachably fastened at its opposite end to another spoke, and engaging said lug to hold the spike in a retracted position.

In testimony whereof I affix my signature in presence of witnesses.

JOSEPH MENNE.

Witnesses:
GEO. A. RICHARDSON,
J. H. LAWLER,
JOHN C. MILLER.

Copies of this patent may be obtained for five cents each, by addressing the "Commissioner of Patents, Washington, D. C."